US008533618B2

(12) United States Patent
Skuratovsky

(10) Patent No.: US 8,533,618 B2
(45) Date of Patent: Sep. 10, 2013

(54) CHANGING MULTIPLE BOOLEAN STATE ITEMS IN A USER INTERFACE

(75) Inventor: Ilya Skuratovsky, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/870,874

(22) Filed: Oct. 11, 2007

(65) Prior Publication Data

US 2009/0100382 A1    Apr. 16, 2009

(51) Int. Cl.
*G06F 3/048* (2013.01)

(52) U.S. Cl.
USPC ........... 715/767; 715/845; 715/859; 345/352; 345/348

(58) Field of Classification Search
USPC .................................. 715/857, 859
See application file for complete search history.

(56) References Cited

U.S. PATENT DOCUMENTS

| | | | | |
|---|---|---|---|---|
| 4,984,152 A * | 1/1991 | Muller | ........................... | 715/856 |
| 5,319,385 A * | 6/1994 | Aires | ............................ | 345/156 |
| 6,104,398 A * | 8/2000 | Cox et al. | ....................... | 715/821 |
| 6,587,131 B1 * | 7/2003 | Nakai et al. | .................... | 715/857 |
| 6,901,556 B2 * | 5/2005 | Bosma et al. | .................. | 715/769 |
| 6,959,423 B2 * | 10/2005 | Bosma et al. | .................. | 715/845 |
| 7,366,995 B2 * | 4/2008 | Montague | ....................... | 715/798 |
| 7,725,841 B2 * | 5/2010 | Michelman et al. | ........... | 715/856 |
| 2006/0007174 A1 * | 1/2006 | Shen | .............................. | 345/173 |
| 2006/0106825 A1 * | 5/2006 | Cozzi | ............................ | 707/100 |
| 2008/0074389 A1 * | 3/2008 | Beale | ............................ | 345/161 |

OTHER PUBLICATIONS

Smith, et al., Adode® Creative Suite® 3 Design Premium All-in-One Desk Reference for Dummies®, Aug. 2007, Wiley & Son Pub., Chapter 3.*

* cited by examiner

*Primary Examiner* — Ramsey Refai
*Assistant Examiner* — William Titcomb
(74) *Attorney, Agent, or Firm* — Yudell Isidore Ng Russell PLLC

(57) ABSTRACT

A method of changing the states of multiple Boolean state items displayed in a computer system user interface window draws a box around a plurality of Boolean state items displayed in the window. Each of the items displayed in the window initial state, which is either of the two Boolean states. In response to drawing the box, the method changes the initial state of at least some of the items within the box to a final state, which is the opposite Boolean state. The change of state may be according to a default behavior. The user may change the default behavior.

15 Claims, 4 Drawing Sheets

CHANGING MULTIPLE BOOLEAN STATE ITEMS IN A USER INTERFACE

BACKGROUND OF THE INVENTION

1. Technical Field

The present invention relates generally to the field of computer user interfaces, and more particularly to a method of changing the state of multiple Boolean state items in a graphical user interface.

2. Description of the Related Art a graphical user interface commonly contains elements that allow a user to indicate an enabled/disabled state. The most common graphical control or widget for this function is a checkbox. To perform the enable/disable action, the user moves the mouse pointer within the borders of the checkbox and clicks. This changes the state of the checkbox to the opposite state and indicates in a graphical user interface that this has been done, typically by drawing a checkmark in the element as I enabled and removing the checkmark from the element is disabled.

The current method for selecting checkboxes and falls having the user select each checkbox one a time. When the number of items the user needs to select a small this provides an efficient way of interacting with the graphical user interface. However, for some applications, the number of checkbox knew to be selected or unselected may be very large. It takes some dexterity to check or uncheck a checkbox. Accordingly, interacting with large numbers of checkboxes can become tedious.

SUMMARY OF THE INVENTION

A graphical user interface commonly contains elements that allow a user to indicate an enabled/disabled state. The most common graphical control or widget for this function is a checkbox. To perform the enable/disable action, the user moves the mouse pointer within the borders of the checkbox and clicks. This changes the state of the checkbox to the opposite state and indicates in a graphical user interface that this has been done, typically by drawing a checkmark in the element if enabled and removing the checkmark from the element if disabled.

The current method for selecting checkboxes involves having the user select each checkbox one at a time. When the number of items the user needs to select is small this provides an efficient way of interacting with the graphical user interface. However, for some applications, the number of checkboxes needed to be selected or unselected may be very large. It takes some dexterity to check or uncheck a checkbox. Accordingly, interacting with large numbers of checkboxes can become tedious.

The step of drawing the box may comprises positioning a graphical pointer at a first position in the window, pressing a mouse button, moving the graphical pointer to a second position in the window, and releasing the mouse button. The drawing step may include the further step of scrolling the window if the graphical pointer is moved out of a viewable area of the window prior to releasing the mouse button.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
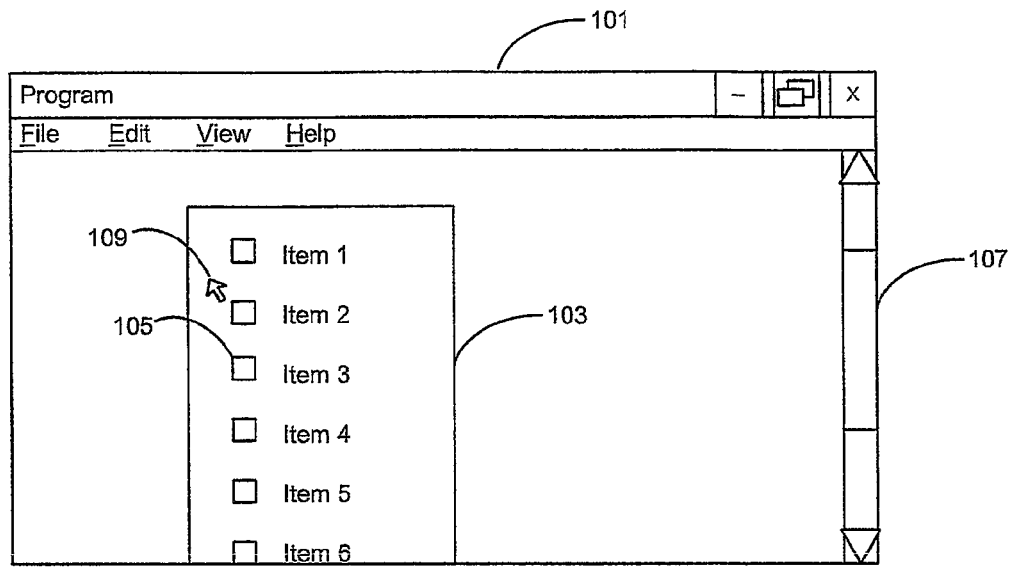
FIGS. 1A-1C illustrate the operation of an embodiment of a graphical user interface according to the present invention.

FIG. 11A illustrates an embodiment of a graphical user interface window 101 according to the present invention. Window 101 includes a selectable item container 103. Selectable item container 103 contains a plurality of selectable items, identified as item 1-item 6. As used herein, a selectable item is an item that can be in either of two Boolean states. Each selectable item includes a checkbox 105 and an item identifier. Checkboxes are well-known graphical user interface controls or widgets that are used to select one of two Boolean states for a selectable item. Window 101 includes a scrollbar 107 that may be used in a manner well known to those skilled in the art to change the viewable area of window 101. A portion of the information content in window 101, including selectable item container 103 extends outside the viewable area of window 101. A graphical pointer 109 is displayed in the window 101. As is well known to those skilled in the art, graphical pointer 109 may be operated by a mouse (not shown) or other, and pointing device.

Figure 1B:
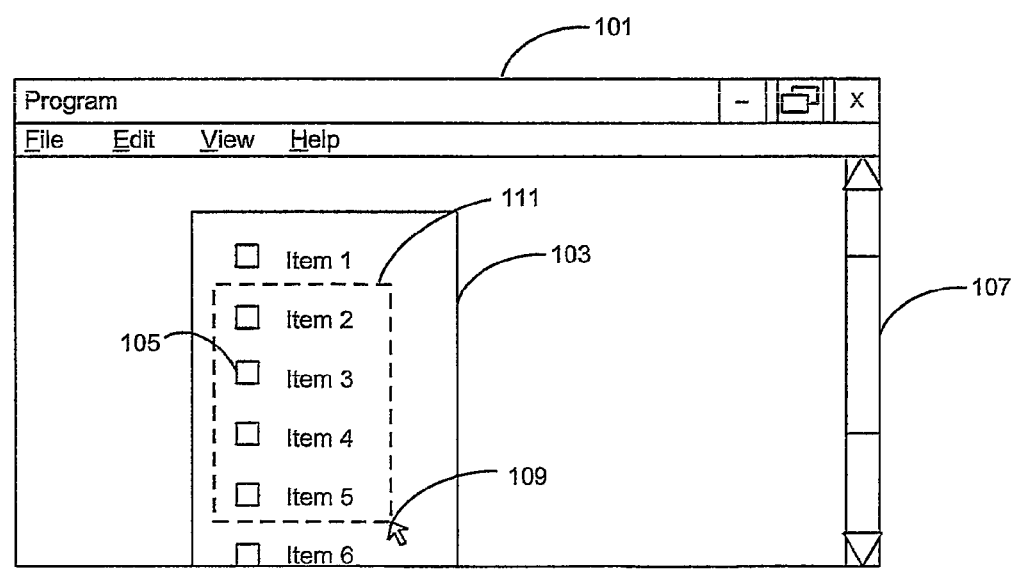
Figure 1C:
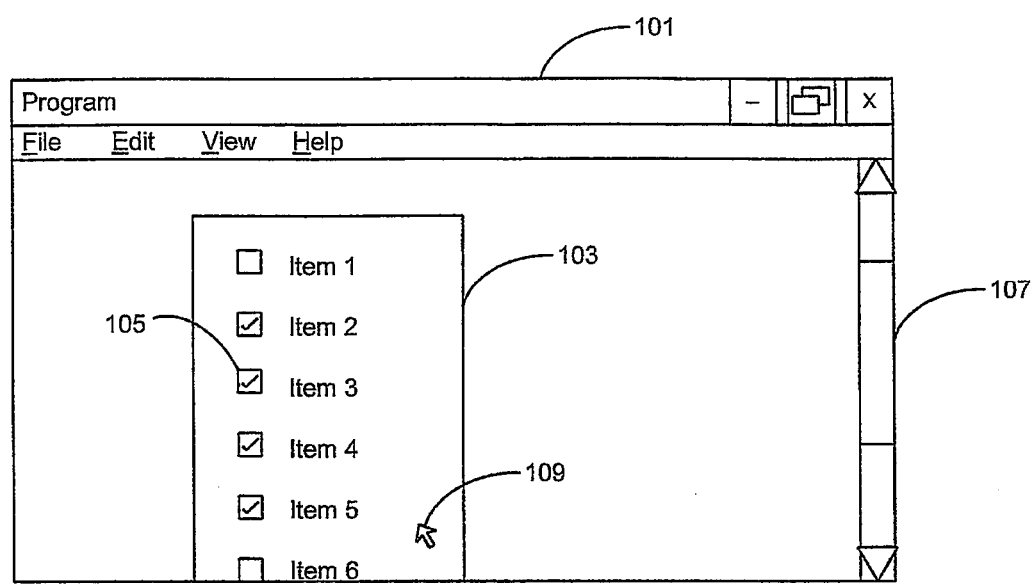

Pointer 109 may be operated according to the present invention to enable a change of Boolean states of multiple items displayed in selectable item container 103. In FIG. 1A, all items in selectable item container 103 are in the unselected state, as indicated by empty checkboxes 105. In order to change the state of multiple items, pointer 109 is positioned at a point within selectable item container 103. The left mouse button (not shown) is pressed and pointer 109 is dragged to a position as shown in FIG. 1B. Processing the mouse button and dragging pointer 109 invokes the well-known draw box graphical feature, thereby drawing a box 111 item 2-item 5. As shown in FIG. 1C, releasing the mouse button causes the Boolean states of item 2-item 5 to change from unselected to selected. The selected state of item 2-item 5 as indicated by checkmarks in their associated checkboxes 105.

Figure 2:
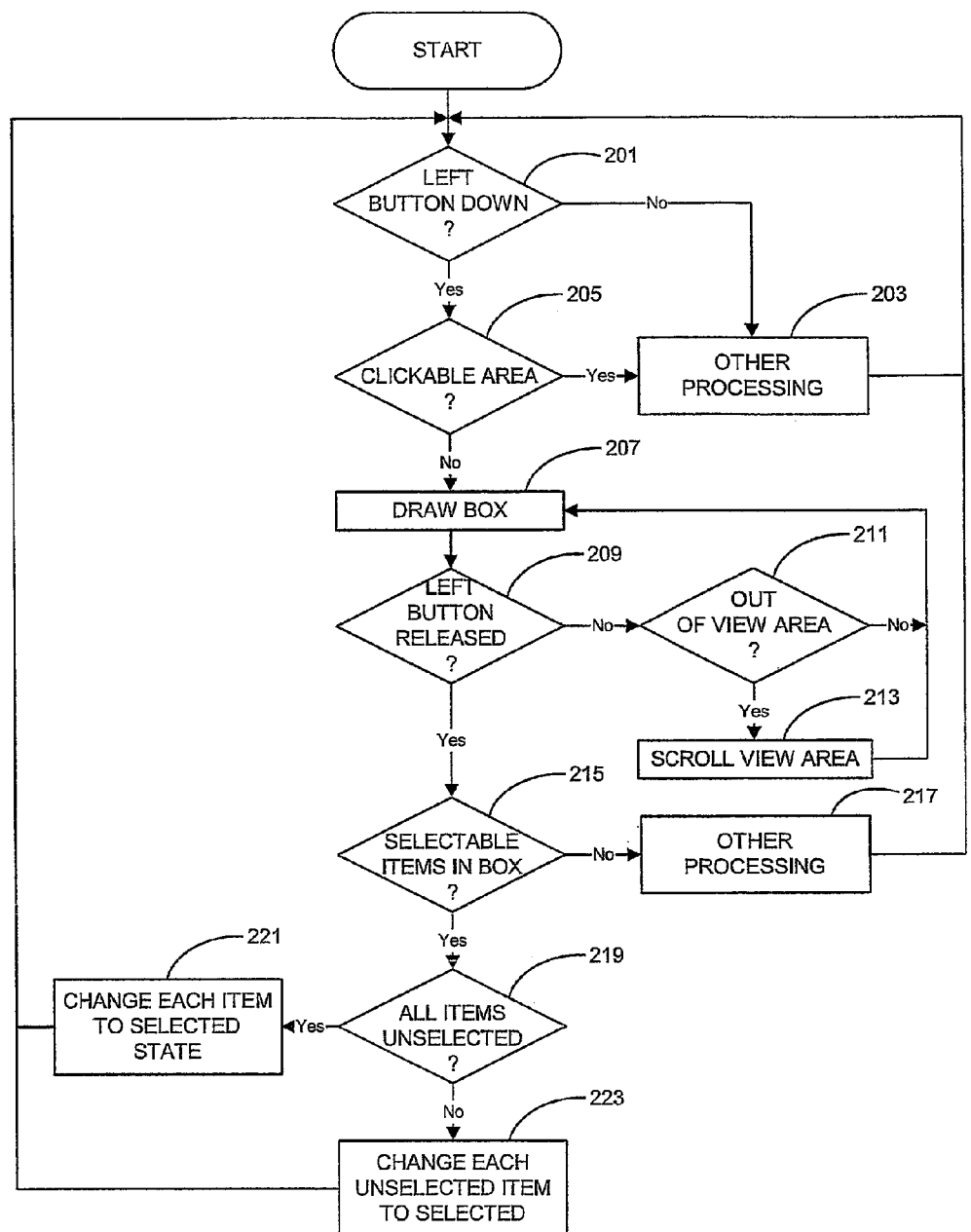
FIG. 2 is a flow chart of an embodiment of processing according to the present invention; and, FIG. 3 is a block diagram of an information handling system adapted to embody a system according to the present invention.

FIG. 2 is a flow chart of an embodiment of processing according to the present invention. The system waits for user input. If, as determined at decision block 201, the user input is not left button down, the system performs other processing, as indicated at block 203. If the user input is left mouse button down, the system determines, at decision block 205, if the pointer is in a clickable area. A clickable area is defined as an area in the window associated with a particular action. For example, a clickable area may be a checkbox, a radio button, a scroll control, a maximize button, and exit button, or any other graphical control or widgets. If the pointer is in a clickable area, the system performs other processing, as indicated at block 203. If, as determined at decision block 205, the pointer is not in a clickable area, the system invokes the draw box routine, as indicated at block 207. The system continues to execute the draw box routine until, as determined at decision block 209, the left button is released. If, as determined at decision block 211, the pointer is moved out of the viewable area of the window before the left button is released, the system scrolls the viewable area, as indicated at block 213. If, as determined at decision block 209, the left button is released, the system determines, at decision block 215, if selectable items are in the box. If not, the system performs other processing, as indicated at block 217. If, as determined at decision block 215, selectable items on the box, the system may perform a default behavior. In an example of a default behavior, the system determines, at decision block 219, if the current or initial state of all items is unselected. If so, the system changes the state of all items to selected, as indicated at block 221. If, as determined at decision block 219, the state of all items is not unselected, which means that at least one of the items is in the selected state, the system changes the state of all unselected items within the box to selected, as indicated at block 223. In other words, according to the default behavior of the embodiment of FIG. 1, if the state of any, but not every, item in the box is initially selected, the final state of each item in the box becomes selected. If the initial state of every item in the box selected, the final state becomes unselected.

It should be recognized that embodiments of the present invention may perform other default behaviors. The default behavior can be modified by the application developer at development time or by a user/administrator at runtime. For example, if the initial state of any, but not every, item in the box is unselected, the final state of each item in the box becomes unselected. If the initial state of every item in the box unselected, the final state becomes selected.

Figure 3:
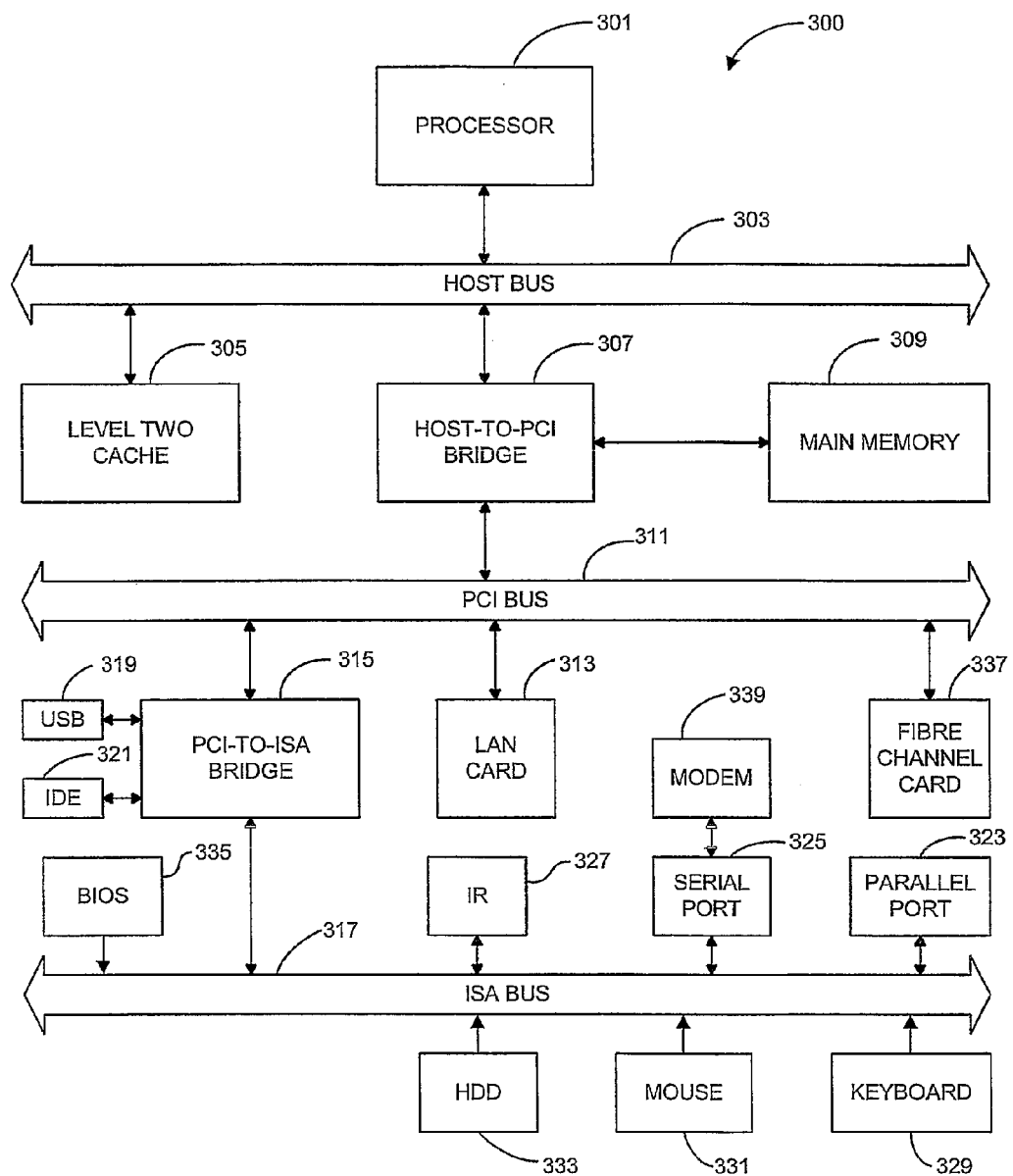

Referring now to FIG. 3, there is illustrated a block diagram of a generic information handling system 300 capable of performing the server and client operations described herein. Computer system 300 includes processor 301 which is coupled to host bus 303. Processor 301 preferably includes an onboard cache memory. A level two (L2) cache memory 305 is also coupled to host bus 303. A Host-to-PCI bridge 307 is coupled to host bus 303. Host-to-PCI bridge 307, which is coupled to main memory 309, includes its own cache memory and main memory control functions. Host-to-PCI bridge 307 provides bus control to handle transfers among a PCI bus 311, processor 301, L2 cache 305, main memory 309, and host bus 303. PCI bus 311 provides an interface for a variety of devices including, for example, a local area network (LAN) card 313, a PCI-to-ISA bridge 315, which provides bus control to handle transfers between PCI bus 311 and an ISA bus 317, a universal serial bus (USB) 319, and an IDE device 321. PCI-to-ISA bridge 315 also includes onboard power management functionality. PCI-to-ISA bridge 315 can include other functional elements not shown, such as a real-time clock (RTC), DMA control, interrupt support, and system management bus support.

Peripheral devices and input/output (I/O) devices can be attached to various interfaces or ports coupled to ISA bus 317. Such interfaces or ports may include a parallel port 323, a serial port 325, an infrared (IR) interface 327, a keyboard interface 329, a mouse interface 331, and a hard disk drive (HDD) 333.

A BIOS 335 is coupled to ISA bus 317. BIOS 335 incorporates the necessary processor executable code for a variety of low-level system functions and system boot functions. BIOS 335 can be stored in any computer readable medium, including magnetic storage media, optical storage media, flash memory, random access memory, read only memory, and communications media conveying signals encoding the instructions (e.g., signals from a network). In order to couple computer system 300 to another computer system to copy files or send and receive messages over a network, LAN card 313 may be coupled to PCI bus 311. Similarly, a Fibre Channel card may be coupled to PCI bus 313. Additionally, a modem 339 may be coupled to ISA bus 317 through serial port 325 to support dial-up connections.

While the computer system described in FIG. 3 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of changing a state of multiple Boolean state items displayed in a computer system user interface window, the method comprising:
   in response to an input received from an input device of the computer system, drawing, within the user interface window, a box around a subset of a plurality of Boolean state items displayed in a computer system user interface window, each item of said Boolean state items being in an initial state of two states, wherein said two states comprise a currently selected state and a different unselected state, and wherein said drawing of said box causes said initial state of one or more of said Boolean state items within said box to change to a final state;
   wherein said drawing further comprises:
      detecting a press of a button of said input device;
      in response to detecting said press: determining a first position of a graphical pointer in said window;
      receiving a movement input of said input device to a second position in said window, wherein the movement input corresponds to a movement of said graphical pointer in said window;
      during said receiving of said movement input of said input device: detecting a second position of the graphical pointer in said window; and dynamically drawing said box from said first position to said second position while said button is depressed; and
      detecting a release of said button; and
   in response to drawing said box, a processor changing said initial state of one or more items of said subset of Boolean state items within said box to a final state, wherein said changing said initial state of said subset of Boolean state items within said box to said final state is performed responsive to detecting said release of said button, and said changing further comprising:
  in response to all items of said subset of Boolean state items within said box having said unselected state as said initial state, changing said state of said subset of Boolean state items within said box to said selected state as said final state;
  in response to all items of said subset of Boolean state items within said box having said selected state as said initial state, changing said state of all of said items of said subset of Boolean state items within said box to said unselected state as said final state; and
  in response to a first set of Boolean state items in the subset having the selected state as said initial state and a second set of Boolean state items in said subset having said unselected state as said initial state, changing said initial state of said second set of Boolean state items to said selected state as said final state.

2. The method as claimed in claim 1, further comprising:
  scrolling said window in a direction of the movement of said graphical pointer if said graphical pointer is moved out of a viewable area of said window prior to releasing said button.

3. The method as claimed in claim 1, wherein said changing said initial state of said subset of Boolean state items within said box to a final state further comprises:
  changing said initial state of the subset to said final state according to a default behavior, wherein said default behavior determines said final state of one or more items from said subset of items based on said initial state of said one or more items from said subset.

4. The method as claimed in claim 3, further comprising:
  receiving a modification to said default behavior; and
  in response to receiving said modification to said default behavior, modifying said default behavior, based on said modification;
  wherein said modification to said default behavior is received from one or more of:
    an application developer at development time; and
    an administrator at runtime.

5. A computer system comprising:
  a processor;
  a memory coupled to said processor;
  a pointing device coupled to the computer system; and
  a program code executing on the computer system that causes the computer system to:
    draw, via an input received from said pointing device, a box around a subset of a plurality of Boolean state items displayed in a computer system user interface window, each item of said Boolean state items being in an initial state of two states, wherein said two states comprise a selected state and a different unselected state, and wherein said drawing of said box causes said initial state of one or more of said Boolean state items within said box to change to a final state;
  wherein said program code that causes the computer system to draw comprising program code that causes the computer to:
    detect a press of a button of said input device;
    in response to detecting said press: determine a first position of a graphical pointer in said window;
    receive a movement input of said input device to a second position in said window, wherein the movement input corresponds to a movement of said graphical pointer in said window;
    during said receiving of said movement input of said input device: detect a second position of a graphical pointer in said window; and dynamically draw a shape of said box from said first position to said second position to include all Boolean items within the external edges of the shape of the box while said button is depressed; and
    detect a release of said button; and
    in response to drawing said box, change said initial state of one or more items of said subset of Boolean state items within said box to a final state, wherein said change to said initial state of said subset of Boolean state items within said box to said final state is performed responsive to detecting said release of said button, and said program does that causes the computer to change said initial state further comprising program code that causes the computer to:
      in response to all items of said subset of Boolean state items within said box having said unselected state as said initial state, change said state of said subset of Boolean state items within said box to said selected state as said final state;
      in response to all items of said subset of Boolean state items within said box having said selected state as said initial state, change said state of all of said items of said subset of Boolean state items within said box to said unselected state as said final state; and
      in response to a first set of Boolean state items in the subset having the selected state as said initial state and a second set of Boolean state items in said subset having said unselected state as said initial state, change said initial state of said second set of Boolean state items to said selected state as said final state.

6. The computer system of claim 5, said program code further comprising program code that causes the computer system to scroll said window in a direction of the movement of said graphical pointer if said graphical pointer is moved out of a viewable area of said window prior to releasing said button.

7. The computer system of claim 5, wherein said the program code that causes the computer system to change said initial state of said subset of Boolean state items within said box to a final state further comprises program code that causes the computer system to:
  change said initial state of the subset to said final state according to a default behavior, wherein said default behavior determines said final state of one or more items from said subset of items based on said initial state of said one or more items from said subset; and
  receive a modification to said default behavior; and
  in response to receiving said modification to said default behavior, modify said default behavior, based on said modification;
  wherein said modification to said default behavior is received from one or more of:
    an application developer at development time; and
    an administrator at runtime.

8. A computer-readable storage medium embodying computer program code for changing states of multiple Boolean state items displayed in a computer system user interface window, the computer program code comprising computer executable instructions configured for:
  drawing, via an input received from said pointing device, a box around a subset of a plurality of Boolean state items displayed in a computer system user interface window, each item of said Boolean state items being in an initial state of two states, wherein said two states comprise a selected state and a different unselected state, and wherein said drawing of said box causes said initial state of one or more of said Boolean state items within said box to change to a final state;

wherein the computer executable instructions are further configured for:

- detecting a press of a button of said input device;
- in response to detecting said press: determining a first position of a graphical pointer in said window;
- receiving a movement input of said input device to a second position in said window, wherein the movement input corresponds to a movement of said graphical pointer in said window;
- during said receiving of said movement input of said input device: detecting to a second position of a graphical pointer in said window; dynamically drawing said box from said first position to said second position while said button is depressed; and scrolling said window in a direction of the movement of said graphical pointer if said graphical pointer is moved out of a viewable area of said window prior to releasing mouse button; and
- detecting a release of said button; and
- in response to drawing said box changing said initial state of one or more items of said subset of Boolean state items within said box to a final state, wherein said changing of said initial state of said subset of Boolean state items within said box to said final state is performed responsive to detecting said release of said button, and said changing further comprising:
  - in response to all items of said subset of Boolean state items within said box having said unselected state as said initial state, changing said state of said subset of Boolean state items within said box to said selected state as said final state;
  - in response to all items of said subset of Boolean state items within said box having said selected state as said initial state, changing said state of all of said items of said subset of Boolean state items within said box to said unselected state as said final state; and
  - in response to a first set of Boolean state items in the subset having the selected state as said initial state and a second set of Boolean state items in said subset having said unselected state as said initial state, changing said initial state of said second set of Boolean state items to said selected state as said final state.

9. The computer-readable storage medium of claim 8, wherein said changing said initial state of said subset of Boolean state items within said box to a final state further comprises:

changing said initial state of the subset to said final state according to a default behavior; and
in response to receiving said modification to said default behavior, modifying said default behavior, based on said modification;
wherein said modification to said default behavior is received from one or more of:
an application developer at development time; and
an administrator at runtime.

10. The method as claimed in claim 3, wherein said changing said initial state of the subset to said final state according to said default behavior, further comprises:
determining if said initial state of all Boolean state items in said subset is unselected;
in response to determining said initial state of all Boolean state items in said subset is said unselected state, changing the initial state of all Boolean state items in said subset to said selected state as said final state; and
in response to determining said initial state of any but not every Boolean state item within said box being in said unselected state, changing the initial state of all Boolean state items in said subset to said selected state.

11. The method as claimed in claim 3, wherein said changing said initial state of said subset to said final state according to said default behavior, further comprises:
determining if said initial state of all Boolean state items in said subset is selected;
in response to determining said initial state of all Boolean state items in said subset is said selected state, changing the initial state of all Boolean state items in said subset to said unselected state as said final state; and
in response to determining said initial state of any but not every Boolean state item within said box being in said selected state, changing the initial state of all Boolean state items in said subset to said unselected state.

12. The computer system of claim 7, wherein said changing said initial state of the subset to said final state according to said default behavior, further comprises program code that causes the computer system to:
determine if said initial state of all Boolean state items in said subset is unselected;
in response to determining said initial state of all Boolean state items in said subset is said unselected state, change the initial state of all Boolean state items in said subset to said selected state as said final state; and
in response to determining said initial state of any but not every Boolean state item within said box being in said unselected state, change the initial state of all Boolean state items in said subset to said selected state.

13. The computer system of claim 7, wherein said changing said initial state of said subset to said final state according to said default behavior, further comprises program code that causes the computer system to:
determine if said initial state of all Boolean state items in said subset is selected;
in response to determining said initial state of all Boolean state items in said subset is said selected state, change the initial state of all Boolean state items in said subset to said unselected state as said final state; and
in response to determining said initial state of any but not every Boolean state item within said box being in said selected state, change the initial state of all Boolean state items in said subset to said unselected state.

14. The computer-readable storage medium of claim 9, wherein said changing said initial state of the subset to said final state according to said default behavior, further comprises:
determining if said initial state of all Boolean state items in said subset is unselected;
in response to determining said initial state of all Boolean state items in said subset is said unselected state, changing the initial state of all Boolean state items in said subset to said selected state as said final state; and
in response to determining said initial state of any but not every Boolean state item within said box being in said unselected state, changing the initial state of all Boolean state items in said subset to said selected state.

15. The computer-readable storage medium of claim 9, wherein said changing said initial state of said subset to said final state according to said default behavior, further comprises:
determining if said initial state of all Boolean state items in said subset is selected;

in response to determining said initial state of all Boolean state items in said subset is said selected state, changing the initial state of all Boolean state items in said subset to said unselected state as said final state; and in response to determining said initial state of any but not every Boolean state item within said box being in said selected state, changing the initial state of all Boolean state items in said subset to said unselected state.

\* \* \* \* \*